(12) United States Patent
Bueneman

(10) Patent No.: US 6,293,369 B1
(45) Date of Patent: Sep. 25, 2001

(54) SHOPPING CART LOCKING SYSTEM

(76) Inventor: W. T. Bueneman, 1240 Bass Blvd., Dunedin, FL (US) 34698

( * ) Notice: Subject to any disclaimer, the term of this patent is extended or adjusted under 35 U.S.C. 154(b) by 0 days.

(21) Appl. No.: 09/624,100

(22) Filed: Jul. 24, 2000

(51) Int. Cl.$^7$ .................................................. F16D 66/00
(52) U.S. Cl. .......................... 188/29; 188/1.12; 188/19; 280/33.994
(58) Field of Search .............................. 188/1.12, 29, 19, 188/57, 20; 280/33.994

(56) References Cited

U.S. PATENT DOCUMENTS

| | | | |
|---|---|---|---|
| 3,117,653 | * | 1/1964 | Altherr ................................ 188/1.12 |
| 5,042,622 | * | 8/1991 | Smith et al. ......................... 188/1.12 |
| 5,199,534 | * | 4/1993 | Goff .................................... 188/1.12 |
| 5,519,916 | * | 5/1996 | Mainard .............................. 188/1.12 |

* cited by examiner

Primary Examiner—Matthew C. Graham

(57) ABSTRACT

A shopping cart locking system. A locking assembly includes a generally cylindrical retainer having a vertically extending axial slot along the first edge. A rigid bracket is secured along a second edge of the retainer. A clevis at the lower extent of the bracket has apertures, a first vertical space, an upper member with two forwardly extending fingers defining a second vertical space vertically aligned with the first space of the clevis. A foot is selectively positionable between an upper inactive orientation and a lower orientation into frictional braking contact with a wheel below the foot. An upper end of the foot has a generally rectangular recess. A coupling pin extends horizontally through a central extent of the foot and through the recess. A joining leg has an upper end with an aperture located between the first space of the clevis. A first pin rotatably couples the leg to the clevis. The leg has a lower end extending into the recess of the foot. A coupling pin pivotably couples the leg and the foot through an aperture in the leg and an aperture in the foot.

4 Claims, 4 Drawing Sheets

SHOPPING CART LOCKING SYSTEM

BACKGROUND OF THE INVENTION

1. Field of the Invention

The present invention relates to a shopping cart locking system and more particularly pertains to precluding inadvertent rolling of shopping carts.

2. Description of the Prior Art

The use of shopping carts and locking systems of known designs and configurations is known in the prior art. More specifically, shopping carts and locking systems of known designs and configurations previously devised and utilized for the purpose of precluding inadvertent rolling of wheeled shopping carts are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,042,622 to Smith et al. discloses a shopping cart foot brake assembly. U.S. Pat. No. 5,328,000 to Rutter et al. discloses a foot actuated wheel base. U.S. Pat. No. 5,383,536 discloses a foot actuated wheel brake. Lastly, U.S. Pat. No. 5,735,367 to Brubaker discloses a hand operated shopping cart brake.

While these devices fulfill their respective, particular objectives and requirements, the aforementioned patents do not describe a shopping cart locking system that allows abating accidents associated with shopping carts through known methods and aparatuses.

In this respect, the shopping cart locking system according to the present invention substantially departs from the conventional concepts and designs of the prior art, and in doing so provides an apparatus primarily developed for the purpose of abating accidents associated with shopping carts through known methods and apparatuses.

Therefore, it can be appreciated that there exists a continuing need for a new and improved shopping cart locking system which can be used for abating accidents associated with shopping carts through known methods and apparatuses. In this regard, the present invention substantially fulfills this need.

SUMMARY OF THE INVENTION

In view of the foregoing disadvantages inherent in the known types of shopping carts and locking systems of known designs and configurations now present in the prior art, the present invention provides an improved shopping cart locking system. As such, the general purpose of the present invention, which will be described subsequently in greater detail, is to provide a new and improved shopping cart locking system and method which has all the advantages of the prior art and none of the disadvantages.

To attain this, the present invention essentially comprises a shopping cart. The shopping cart has a basket for supporting items to be transported. The shopping cart also has a frame with a four-cornered base coupled with respect to the basket. An upwardly extending handle is provided at the upper end of the cart. Four rotatable wheels are provided at the bottom of the cart. A locking assembly is next provided. The locking assembly includes a generally cylindrical vertical retainer. A vertically extending axial slot is provided along a first edge of the retainer. The retainer is secured to the frame above one wheel with an adhesive. The cylindrical retainer has a rigid bracket secured by rivets at spaced locations of the retainer along a second edge of the retainer opposite from the slot. A clevis is provided at a lower extent of the bracket. Horizontal apertures are provided through the clevis and a first vertical space is defined between the horizontal apertures. The bracket also has an upper member. The upper member has two forwardly extending fingers. A second vertical space is defined between the fingers. The second vertical space is vertically aligned with the first space between the clevis. Shields are next provided. The shields extend upwardly and downwardly from the retainer. Next provided is a foot. The foot is formed of an elastomeric material selected from the class of elastomeric materials including plastic and rubber, natural or synthetic, or blends thereof. The foot has a lower end with teeth. The foot is selectively positionable between an upper inactive orientation and a lower orientation in frictional braking contact with a wheel below. An upper end of the foot has a generally rectangular recess. A knob extends laterally from the foot to assist a user in raising and lowering of the foot. A joining leg is next provided. The joining leg has a length of between about 4 and 12 inches. An upper end of the leg is provided with an aperture located between the first space of the clevis. A first pin is provided. The first pin rotatably couples the leg to the clevis. The leg has a lower end extending into the recess of the foot. A coupling pin couples the leg and the foot through an aperture in the leg and an aperture in the foot. In this manner pivotal coupling is effected between the leg and the foot. In operation and use pivoting of the leg upwardly to an upper orientation into the space between the fingers will frictionally restrain the leg and foot to allow free movement of the shopping cart and prevent movement of the leg downwardly. Alternatively, pivoting of the leg to the downward orientation with the foot in contact with the wheel will preclude inadvertent movement of the wheel and shopping cart.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved shopping cart locking system which has all of the advantages of the prior art shopping carts and locking systems of known designs and configurations and none of the disadvantages.

It is another object of the present invention to provide a new and improved shopping cart locking system which may be easily and efficiently manufactured and marketed.

It is further object of the present invention to provide a new and improved shopping cart locking system which is of durable and reliable constructions.

An even further object of the present invention is to provide a new and improved shopping cart locking system which is susceptible of a low cost of manufacture with regard to both materials and labor, and which accordingly is then susceptible of low prices of sale to the consuming public, thereby making such shopping cart locking system economically available to the buying public.

Even still another object of the present invention is to provide a shopping cart locking system for precluding the inadvertent rolling of shopping carts.

Lastly, it is an object of the present invention to provide a new and improved shopping cart locking system. A locking assembly includes a generally cylindrical retainer having a vertically extending axial slot along the first edge. A rigid bracket is secured along a second edge of the retainer. A clevis at the lower extent of the bracket has apertures, a first vertical space, an upper member with two forwardly extending fingers defining a second vertical space vertically aligned with the first space of the clevis. A foot is selectively positionable between an upper inactive orientation and a lower orientation into frictional braking contact with a wheel below the foot. An upper end of the foot has a generally rectangular recess. A joining leg has an upper end with an aperture located between the first space of the clevis. A first pin rotatably couples the leg to the clevis. The leg has a lower end extending into the recess of the foot. A coupling pin pivotably couples the leg and the foot through an aperture in the leg and an aperture in the foot.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
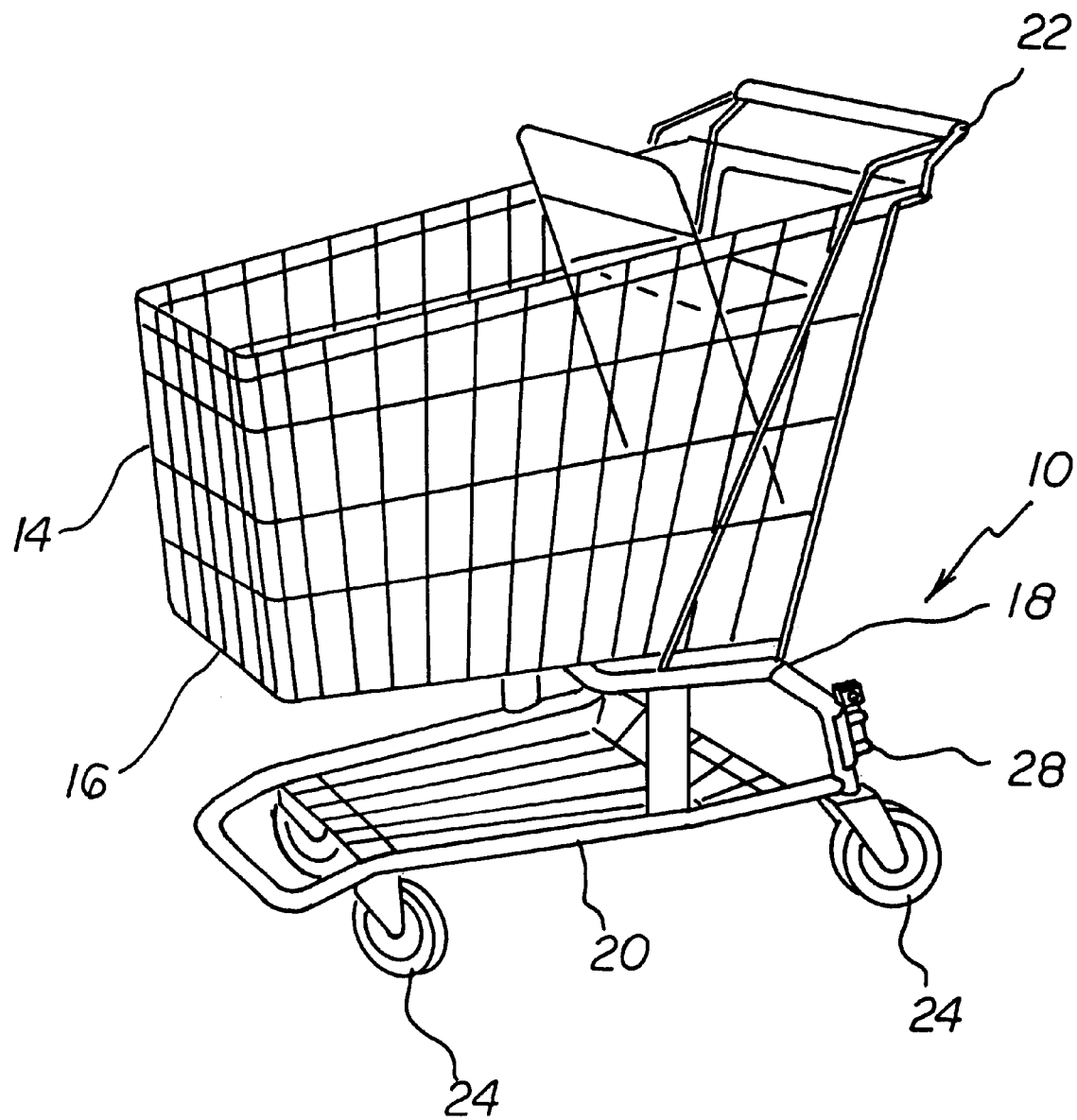
FIG. 1 is a perspective illustration of a new and improved shopping cart locking system constructed in accordance with the principles of the present invention.
Figure 2:
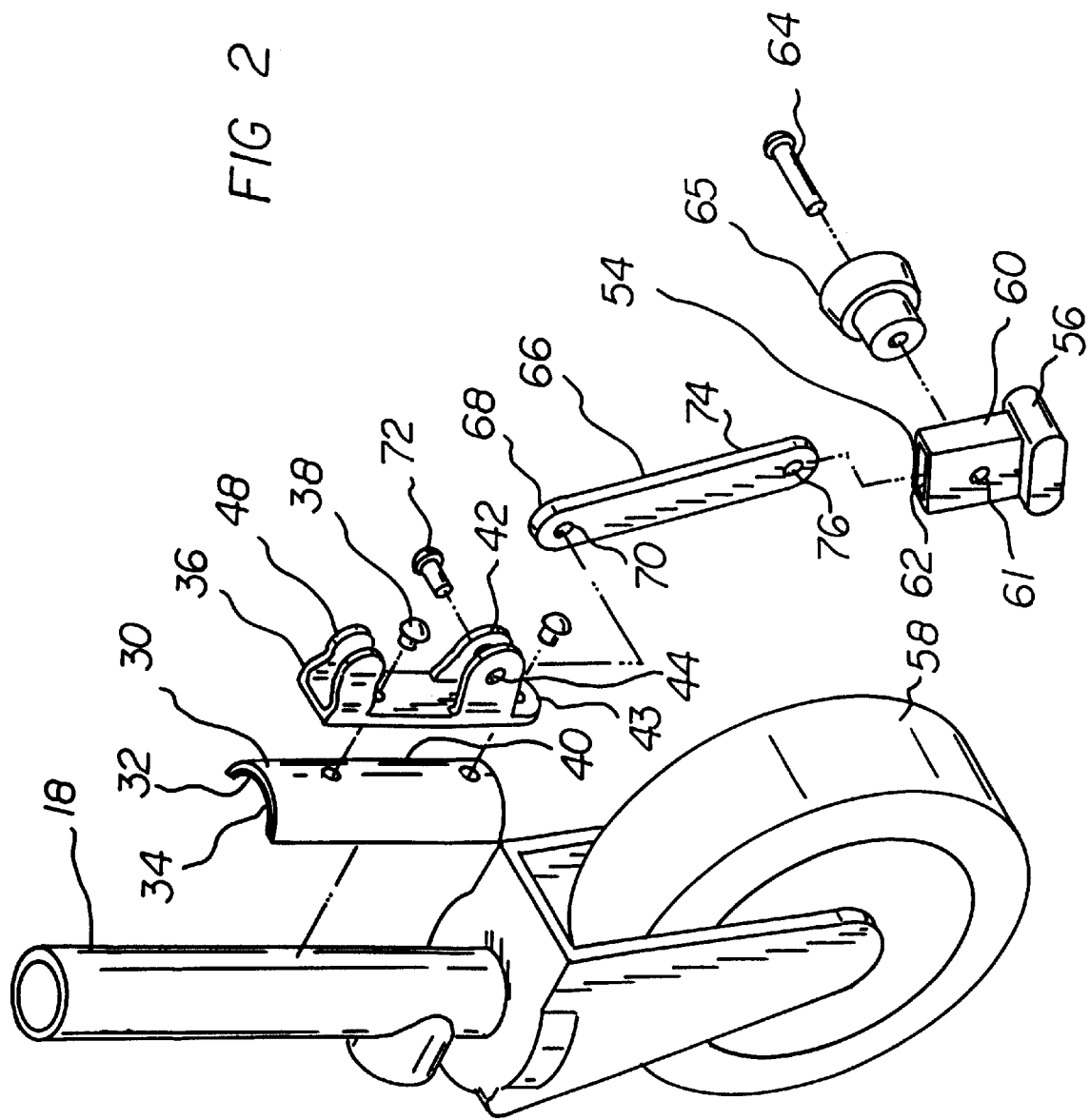
FIG. 2 is an exploded perspective illustration of the locking assembly shown in FIG. 1.
Figure 5:
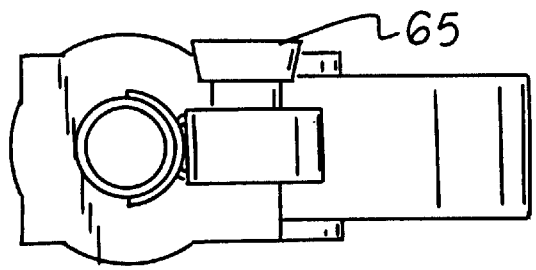
FIGS. 3, 4 and 5 are side, front and top elevational views of the locking assembly shown in FIGS. 1 and 2 with the foot in the raised orientation.
Figure 3:
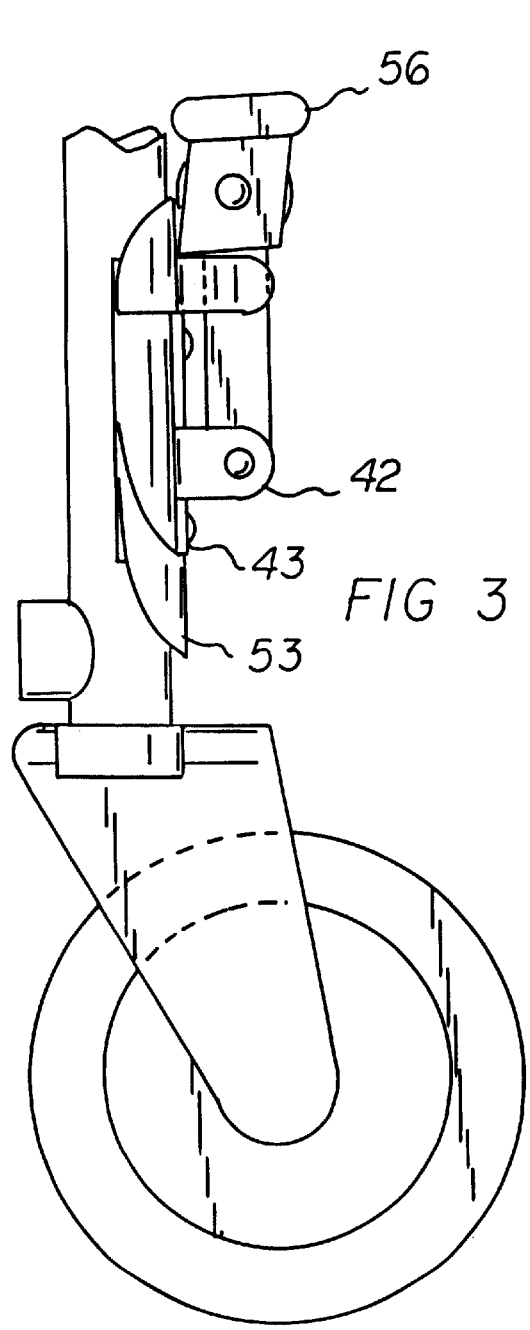
Figure 4:
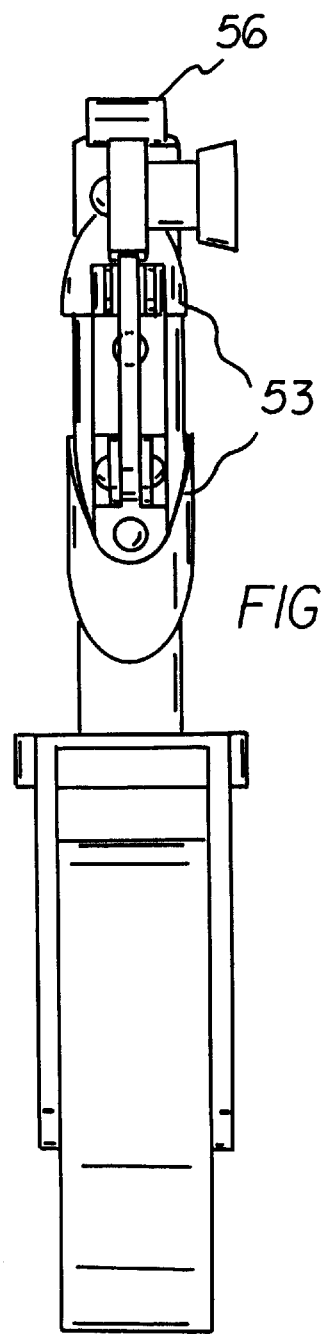
Figure 8:
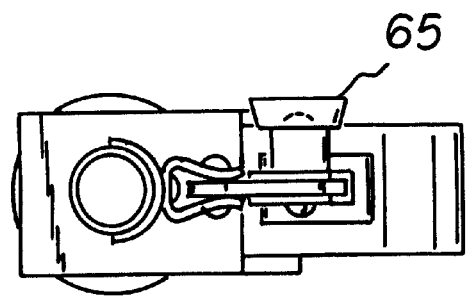
FIGS. 6, 7 and 8 are side, front and top elevational views similar to FIGS. 3, 4 and 5 but with the foot in the lowered orientation.
Figure 6:
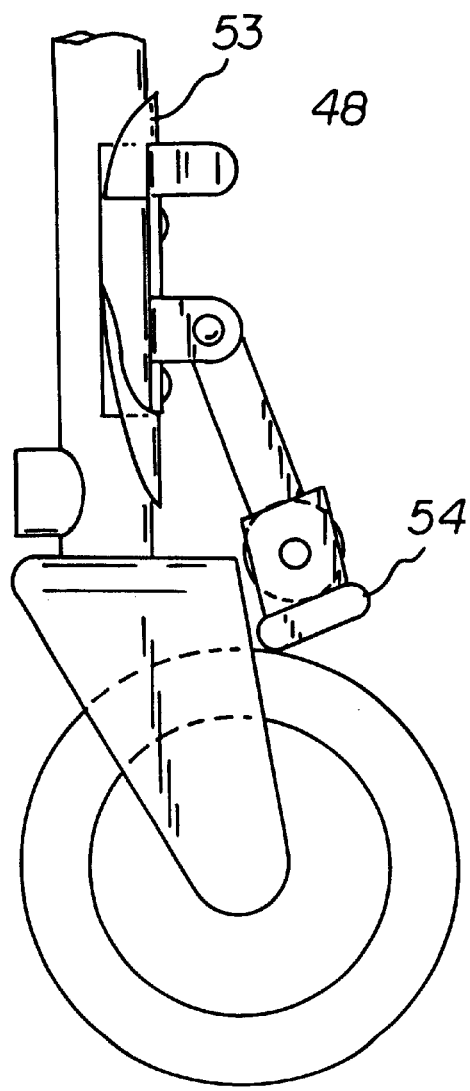
Figure 7:
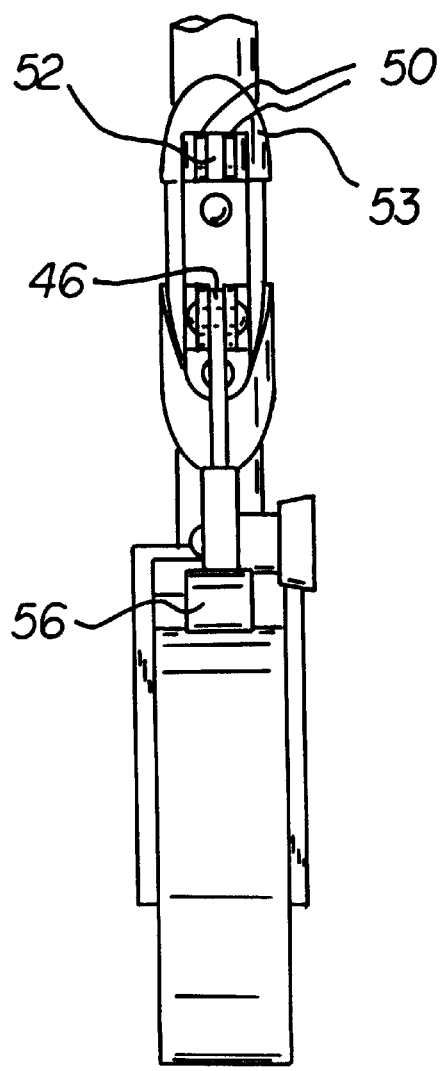

With reference now to the drawings, and in particular to FIG. 1 thereof, the preferred embodiment of the new and improved shopping cart locking system embodying the principles and concepts of the present invention and generally designated by the reference numeral 10 will be described.

The present invention, the shopping cart locking system 10 is comprised of a plurality of components. Such components in their broadest context include a shopping cart, a locking assembly, a foot, and a leg. Such components are individually configured and correlated with respect to each other so as to attain the desired objective.

A shopping cart 14 is first provided. The shopping cart has a basket 16 for supporting items to be transported. The shopping cart also has a frame 18 with a four-cornered base 20 coupled with respect to the basket. An upwardly extending handle 22 is provided at the upper end of the cart. Four rotatable wheels 24 are provided at the bottom of the cart.

A locking assembly 28 is next provided. The locking assembly includes a generally cylindrical vertical retainer 30. A vertically extending axial slot 32 is provided along a first edge of the retainer. The retainer is secured to the frame above one wheel with an adhesive 34. The cylindrical retainer has a rigid bracket 36 secured by rivets 38 at spaced locations of the retainer along a second edge 40 of the retainer opposite from the slot. A clevis 42 is provided at a lower extent 43 of the bracket. Horizontal apertures 44 are provided through the clevis and a first vertical space 46 is defined between the horizontal apertures. The bracket also has an upper member 48. The upper member has two forwardly extending fingers 50. A second vertical space 52 is defined between the fingers. The second vertical space is vertically aligned with the first space between the clevis. Shields 53 are next provided. The shields extend upwardly and downwardly from the retainer.

Next provided is a foot 54. The foot is formed of an elastomeric material selected from the class of elastomeric materials including plastic and rubber, natural or synthetic, or blends thereof. The foot has a lower end with teeth 56. The foot is selectively positionable between an upper inactive orientation and a lower orientation in frictional braking contact with a wheel 58 below. An upper end 60 of the foot has a generally rectangular recess 62. A knob 65 extends laterally from the foot to assist a user in raising and lowering of the foot.

A joining leg 66 is next provided. The joining leg has a length of between about 4 and 12 inches. An upper end 68 of the leg is provided with an aperture 70 located between the first space of the clevis. A first pin 72 is provided. The first pin rotatably couples the leg to the clevis. The leg has a lower end 74 extending into the recess of the foot. A coupling pin 64 couples the leg and the foot through an aperture 76 in the leg and an aperture 61 in the foot. In this manner pivotal coupling is effected between the leg and the foot. In operation and use pivoting of the leg upwardly to an upper orientation into the space between the fingers will frictionally restrain the leg and foot to allow free movement of the shopping cart and prevent movement of the leg downwardly. Alternatively, pivoting of the leg to the downward orientation with the foot in contact with the wheel will preclude inadvertent movement of the wheel and shopping cart.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A shopping cart locking system for precluding inadvertent rolling of wheeled shopping carts comprising, in combination:

a shopping cart having a basket for supporting items to be transported, the shopping cart also having a frame with a four-cornered base coupled with respect to the basket with an upwardly extending handle at the upper end thereof and having four rotatable wheels at the bottom thereof;

a locking assembly including a generally cylindrical vertical retainer with a vertically extending axial slot along a first edge thereof secured to the frame above one wheel with an adhesive coupling the cylindrical retainer to the frame, the cylindrical retainer having a rigid bracket secured by rivets at spaced locations of the retainer along a second edge thereof opposite from the slot, the bracket having a clevis at a lower extent thereof with horizontal apertures there through and a first vertical space there between, the bracket also having an upper member with two forwardly extending fingers to define a second vertical space there between vertically aligned with the first space between the clevis and shields extending upwardly and downwardly from the retainer;

a foot formed of an elastomeric material selected from the class of elastomeric materials including plastic and rubber, natural or synthetic, or blends thereof, the foot having a lower end with teeth, the foot being selectively positionable between an upper inactive orientation and a lower orientation in frictional braking contact with a wheel there below, the foot having an upper end with a generally rectangular recess and a knob extending laterally from the foot to assist a user in raising and lowering of the foot; and a joining leg with a length of between about 4 and 12 inches and having an upper end with an aperture located between the first space of the clevis with a first pin rotatably coupling the leg to the clevis, the leg having a lower end extending into the recess of the foot and a coupling pin coupling the leg and the foot through an aperture in the leg and an aperture in the foot for pivotal coupling there between whereby pivoting of the leg upwardly to an upper orientation into the space between the fingers will frictionally restrain the leg and foot to allow free movement of the shopping cart but prevent movement of the leg downwardly, the leg also movable to a downward orientation with the foot in contact with the wheel to preclude inadvertent movement of the wheel and shopping cart.

2. A shopping cart locking system comprising:

a locking assembly including a generally cylindrical retainer with a vertically extending axial slot along a first edge thereof, the cylindrical retainer having a rigid bracket secured along a second edge thereof, the bracket having a clevis at a lower extent thereof with apertures there through and a first vertical space there between, the bracket also having an upper member with two forwardly extending fingers to define a second vertical space there between vertically aligned with the first space between the clevis;

a foot selectively positionable between an upper inactive orientation and a lower orientation in frictional braking contact with a wheel there below and an upper end with a generally rectangular recess; and a joining leg having an upper end with an aperture located between the first space of the clevis with a first pin rotatably coupling the leg to the clevis, the leg having a lower end extending into the recess of the foot and a coupling pin coupling the leg and the foot through an aperture in the leg and an aperture in the foot for pivotal coupling there between.

3. The system as set forth in claim 2 wherein the joining leg has a length of between about 4 and 12 inches.

4. The system as set forth in claim 2 and further including a knob extending laterally from the foot to assist a user in raising and lowering of the foot.

* * * * *